United States Patent
Uesaka et al.

(10) Patent No.: US 10,040,473 B2
(45) Date of Patent: *Aug. 7, 2018

(54) STEERING COLUMN DEVICE

(71) Applicant: FUJI KIKO Co., Ltd., Shizuoka (JP)

(72) Inventors: Yota Uesaka, Shizuoka (JP); Takao Nakaaki, Shizuoka (JP); Osamu Fujimura, Shizuoka (JP)

(73) Assignee: FUJI KIKO Co., Ltd., Kosai-shi (JP)

( * ) Notice: Subject to any disclaimer, the term of this patent is extended or adjusted under 35 U.S.C. 154(b) by 10 days.

This patent is subject to a terminal disclaimer.

(21) Appl. No.: 15/462,946

(22) Filed: Mar. 20, 2017

(65) Prior Publication Data
US 2017/0274923 A1   Sep. 28, 2017

(30) Foreign Application Priority Data

Mar. 28, 2016 (JP) ................................. 2016-063037

(51) Int. Cl.
*B62D 1/184* (2006.01)
*B62D 1/185* (2006.01)
*B62D 1/19* (2006.01)

(52) U.S. Cl.
CPC ............. *B62D 1/184* (2013.01); *B62D 1/185* (2013.01); *B62D 1/192* (2013.01)

(58) Field of Classification Search
CPC .......... B62D 1/18; B62D 1/184; B62D 1/185; B62D 1/19; B62D 1/192; B62D 1/195
See application file for complete search history.

(56) References Cited

U.S. PATENT DOCUMENTS

| 8,894,097 B2 * | 11/2014 | Sulser | B62D 1/184 |
| | | | 280/777 |
| 9,623,896 B2 * | 4/2017 | Uesaka | B62D 1/195 |
| 2003/0160440 A1 * | 8/2003 | Kahlenberg | B62D 1/181 |
| | | | 280/775 |
| 2008/0236326 A1 * | 10/2008 | Matsui | B62D 1/195 |
| | | | 74/493 |

(Continued)

FOREIGN PATENT DOCUMENTS

| EP | 3072779 A1 | 9/2016 |
| JP | 2005-001517 A | 1/2005 |
| WO | 2012000593 A1 | 1/2012 |

OTHER PUBLICATIONS

Extended European search report dated Aug. 8, 2017 in the counterpart European patent application.

*Primary Examiner* — Barry J Gooden, Jr.
(74) *Attorney, Agent, or Firm* — Metrolexis Law Group, PLLC

(57) ABSTRACT

A steering column device includes: an outer column having a tubular shape; an inner column movably inserted in the outer column; a restricting member provided through a tubular wall at a lower section of the outer column in such a way as to be capable of coming in and out of the tubular wall in the thickness direction thereof; and a load absorbing wire including first ends engageable with the restricting member and a second end supported on the inner column side, and configured to be deformed by movement of the second end toward the vehicle front side together with the inner column upon application of a load of a preset value or greater to the inner column toward the vehicle front side, to thereby absorb the load.

4 Claims, 12 Drawing Sheets

(56) References Cited

U.S. PATENT DOCUMENTS

| | | | |
|---|---|---|---|
| 2011/0175335 A1* | 7/2011 | Takezawa | B62D 1/184 280/775 |
| 2012/0112443 A1* | 5/2012 | Arakawa | B62D 1/195 280/777 |
| 2013/0118292 A1* | 5/2013 | Sulser | B62D 1/184 74/493 |
| 2016/0159387 A1* | 6/2016 | Okano | B62D 1/184 74/493 |
| 2016/0280248 A1* | 9/2016 | Uesaka | B62D 1/195 |
| 2017/0274922 A1* | 9/2017 | Uesaka | B62D 1/184 |

* cited by examiner

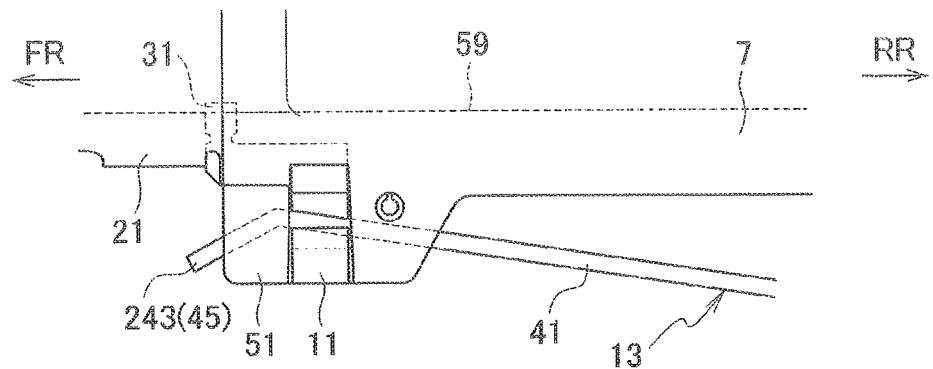
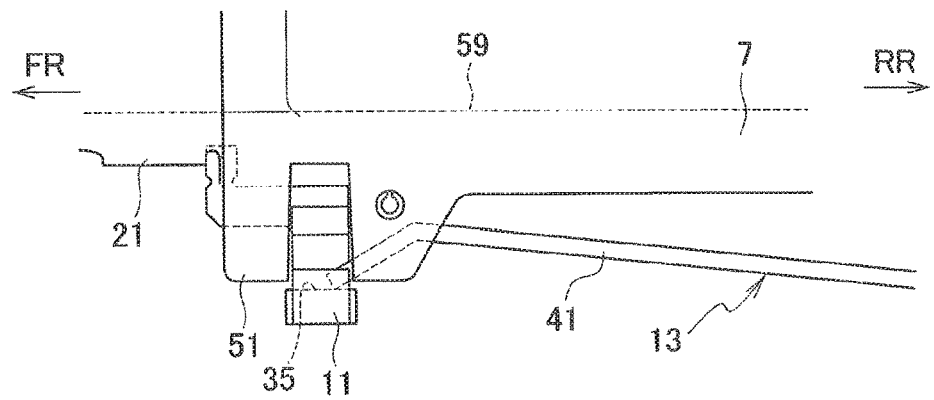
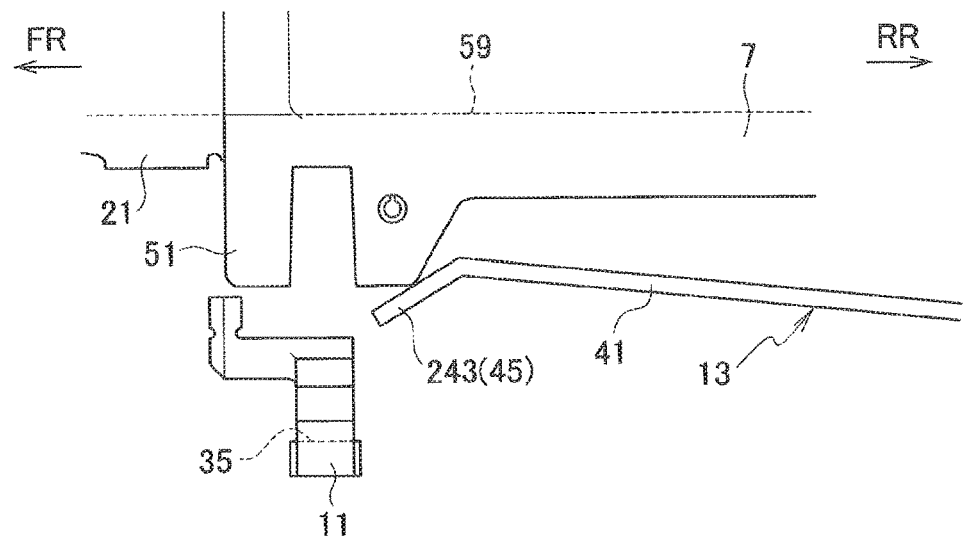

STEERING COLUMN DEVICE

CROSS REFERENCE TO RELATED APPLICATION

This application is based upon and claims the benefit of priority from the prior Japanese Patent Application No. 2016-063037, filed on Mar. 28, 2016, the entire contents of which are incorporated herein by reference.

TECHNICAL FIELD

The present invention relates to a steering column device capable of telescopic operation.

BACKGROUND ART

As a conventional steering column device, there has been one including a vehicle-body attachment bracket configured to be fixed to a vehicle body, a pair of sidewalls provided to extend downward from this vehicle-body attachment bracket, and a steering column disposed between this pair of sidewalls (see Patent Literature 1: WO2012/000593A1, for example).

The steering column in Patent Literature 1 includes an outer column fixed to the vehicle-body side, an inner column arranged to be movable inside the outer column in the axial direction (vehicle longitudinal direction), and a fastener configured to fasten the inner column to the outer column. A restricting member placed on the inner column comes into contact with a locking member placed on an operating shaft for the fastener to thereby define the range of movement of the inner column (telescopic-position adjustment range).

Moreover, in a collision of the vehicle, a load of a preset value or greater may be applied to the restricting member, and a locking plate engaging with the locking member may fracture the restricting member. This fracture allows the inner column to move forward to the outside of the telescopic movement range.

SUMMARY

Meanwhile, in Patent Literature 1, the restricting member is fractured in the middle of contraction of the inner column. This leads to a problem that the impact absorption load abruptly increases in the middle of absorption of the impact energy in the collision of the vehicle.

Thus in view of the above circumstance, an object of the present invention is to provide a steering column device that suppresses abrupt increase in impact absorption load in the middle of absorption of impact energy.

A steering column device according to the present invention includes: an outer column having a tubular shape and arranged along a vehicle longitudinal direction; an inner column inserted in the outer column in such a way as to be movable in a tube-axis direction and capable of telescopic operation; a restricting member provided through a tubular wall at a lower section of the outer column in such a way as to be capable of coming in and out of the tubular wall in a thickness direction thereof, and configured to restrict a front-end position of the inner column in a direction of telescopic contraction thereof with a stopper part; and a load absorbing wire including a first end engageable with the restricting member and a second end supported on the inner column side, and configured to be deformed by movement of the second end toward a vehicle front side together with the inner column upon application of a load of a preset value or greater to the inner column toward the vehicle front side, to thereby absorb the load. The stopper part of the restricting member is normally disposed to project to a radially inner side of an inner peripheral surface of the tubular wall of the outer column. The stopper part of the restricting member is capable of being moved by the load absorbing wire to a position on a radially outer side of the inner peripheral surface of the tubular wall of the outer column when the load absorbing wire is deformed upon application of a load of a preset value or greater to the inner column toward the vehicle front side.

In the steering column device according to the present invention, when the inner column moves toward the vehicle front side in a collision of the vehicle, the stopper part of the restricting member sinks to a radially outer side of the inner peripheral surface of the tubular wall of the outer column. In this way, the front end of the inner column can avoid contact with the stopper part of the restricting member and move toward the front side beyond the stopper part. This makes it possible to suppress abrupt increase in impact absorption load in the middle of absorption of the impact energy.

BRIEF DESCRIPTION OF DRAWINGS

FIG. 12A is a left side view illustrating movement of a restricting member according to a third embodiment and illustrates a state before a collision of a vehicle.

FIG. 12B is a left side view illustrating movement of the restricting member according to the third embodiment and illustrates a state immediately after the collision of the vehicle.

FIG. 12C is a left side view illustrating movement of the restricting member according to the third embodiment and illustrates a state in the last half of the collision of the vehicle.

DESCRIPTION OF EMBODIMENTS

Figure 1:
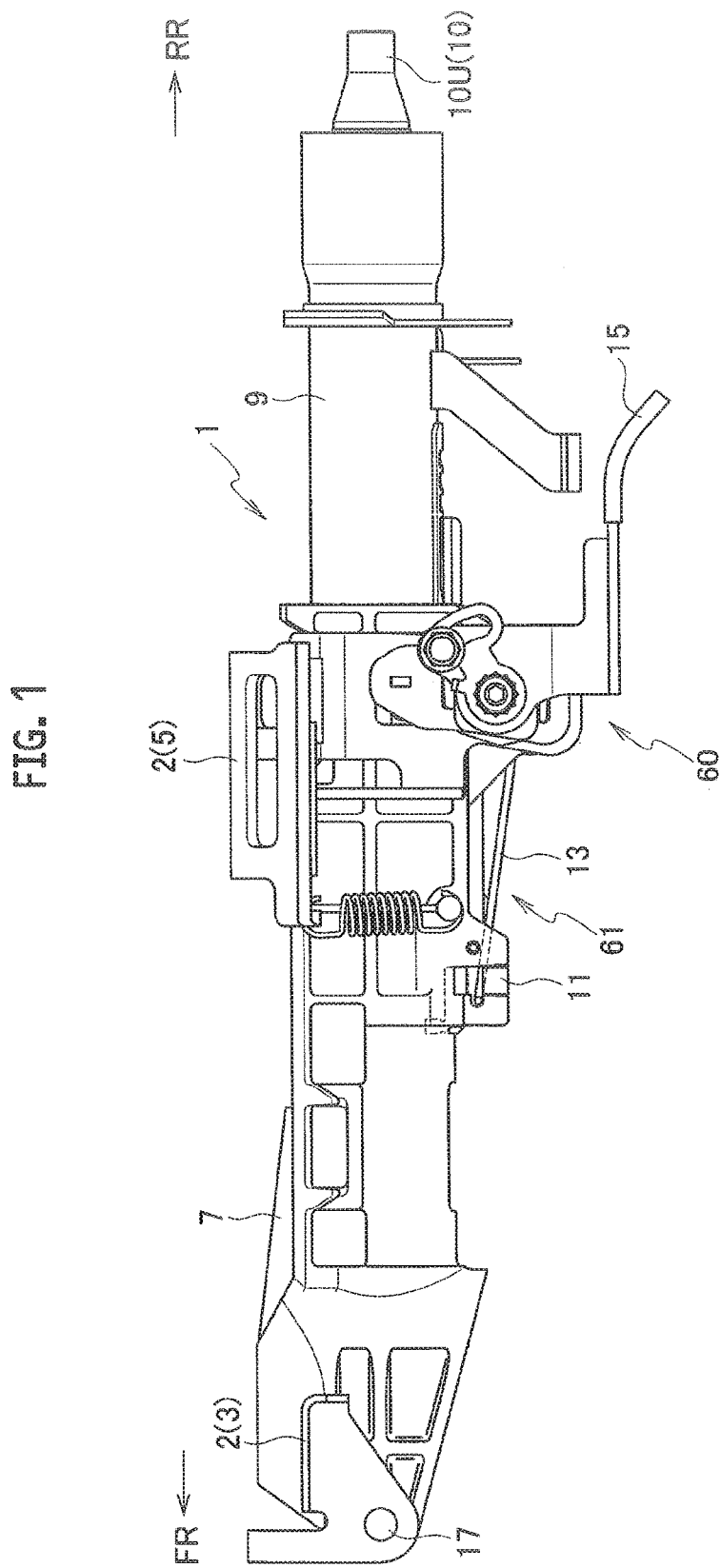
FIG. 1 is a side view of a steering column device according to a first embodiment of the present invention as seen from the left side of a vehicle.

Some embodiments of the present invention will be described below with reference to the drawings. Note that, in the drawings, FR denotes a vehicle front side and RR denotes a vehicle rear side.

First Embodiment

As illustrated in FIGS. 1 to 4, a steering column device 1 according to a first embodiment is a manual-type steering column device 1. The steering column device 1 includes: an attachment bracket 2 for fixing the steering column device 1 to a vehicle body; an outer column 7 supported to the attachment bracket 2 in such a way as to be swingable in the vehicle vertical direction (capable of adjusting its tilt position); an inner column 9 supported to the outer column 7 in such a way as to be movable in the vehicle longitudinal direction (capable of adjusting its telescopic position).

The steering column device 1 further includes: a locking mechanism 60 configured to fasten the attachment bracket 2, the outer column 7, and the inner column 9; an energy absorbing mechanism 61 configured to absorb impact energy in a secondary collision; and a telescopic-position restricting mechanism 62 configured to define an adjustment range for the position of the inner column 9 relative to the outer column 7 in the vehicle longitudinal direction (telescopic position).

The inner column 9 is configured to be inserted in the outer column 7 in such a way as to be movable in the tube-axis direction, thereby allowing telescopic operation. Specifically, in a locked state, the front-rear position of the inner column 9 relative to the outer column 7 is locked (fixed) by a locking member 68. In an unlocked state, an operating lever 15 is pushed down, so that the lock is released and the front-rear position of the inner column 9 relative to the outer column 7 can be changed. Then, after the front-rear position of the inner column 9 is set to a proper position, the operating lever 15 is pushed up and locked, so that the front-rear position of the inner column 9 relative to the outer column 7 is fixed.

The attachment bracket 2 includes a front fixing part 3 and a rear fixing part 5 configured to be fixed to the vehicle body's steering member (not illustrated). The front fixing part 3 includes a pivot portion 17 configured to pivotally support the outer column 7 such that the outer column 7 can be swung, and the rear fixing part 5 includes a pair of hanging portions hanging from its right and left edges. Both hanging portions are provided with a tilt slot bored to define a tilt-position adjustment range along the vehicle vertical direction (tilt direction). The tilt slot is formed of an elongated hole arched about the pivot portion.

The outer column 7 is formed in a tubular shape and arranged between the pair of hanging portions of the attachment bracket 2 along the vehicle longitudinal direction. The outer column 7 has its front end portion pivotally supported to the pivot portion 17 of the front fixing part 3 of the attachment bracket 2 with a bolt. In this way, the rear end side of the outer column 7 can swing in the vehicle vertical direction.

Figure 2:
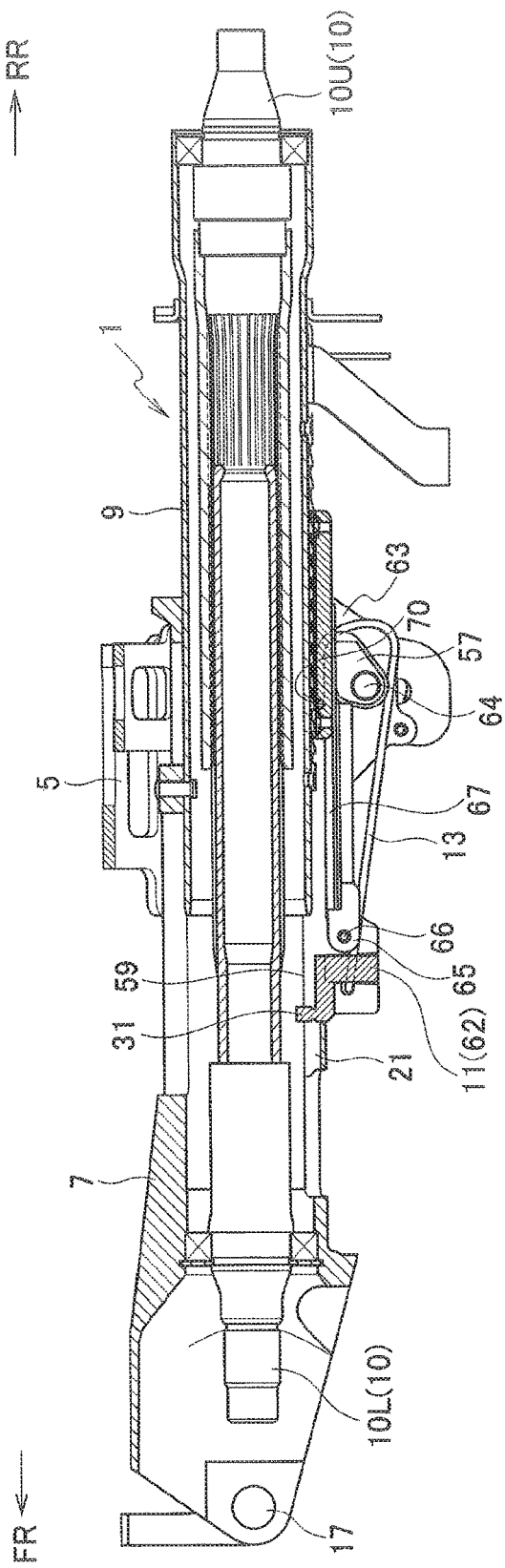
FIG. 2 is a longitudinal cross-sectional view of FIG. 1.

Moreover, as illustrated in FIGS. 1 and 2, the outer column 7 includes a slit 55 penetrating through the lower surface of a tubular wall 21 and extending from the rear edge along the tube-axis direction. The dimension of the slit 55 in the tube-axis direction is set such that the slit 55 extends to a portion of the outer column 7 overlapping the front end of the inner jacket 9 in a state where the inner jacket 9, inserted in the rear end of the outer column 7, is fully contracted by absorbing an impact and moved forward relative to the outer column 7.

As illustrated in FIG. 2, a pair of clamp parts 63 are provided to extend from the opposite edges of the slit 55 extending along the tube-axis direction. Both clamp parts 63 are provided to extend along the vehicle vertical direction at sections located on the rear end side of the slit 55 and facing the hanging portions of the rear fixing part 5. Moreover, an operating shaft 64 penetrates through both clamp parts 63 in such a way as to be turnable about its axis.

A pair of guiderail supporting parts 65 are provided to extend downward from front end portions of the opposite edges of the slit 55 extending along the tube-axis direction, and a supporting pin 66 is laid between the guiderail supporting parts 65. A later-described guiderail 67 is swingably supported on the supporting pin 66. A pair of stopper parts 31 are provided to extend downward on the rear side of the guiderail supporting parts 65, and a later-described restricting member 11 is held between the stopper parts.

The inner column 9 is formed in a tubular shape and inserted in the tube of the outer column 7 in such a way as to be movable in the tube-axis direction. A steering shaft 10 is rotatably supported inside the tubes of the inner column 9 and the outer column 7. The steering shaft 10 includes a lower shaft 10L housed in the outer column 7 and an upper shaft 10U housed in the inner column 9. The upper shaft 10U and the lower shaft 10L are coupled to each other with a spline(s). Thus, the upper shaft 10U and the lower shaft 10L can rotate together about an axis, and the upper shaft 10U can move relative to the lower shaft 10L in the direction of the axis.

Figure 3:
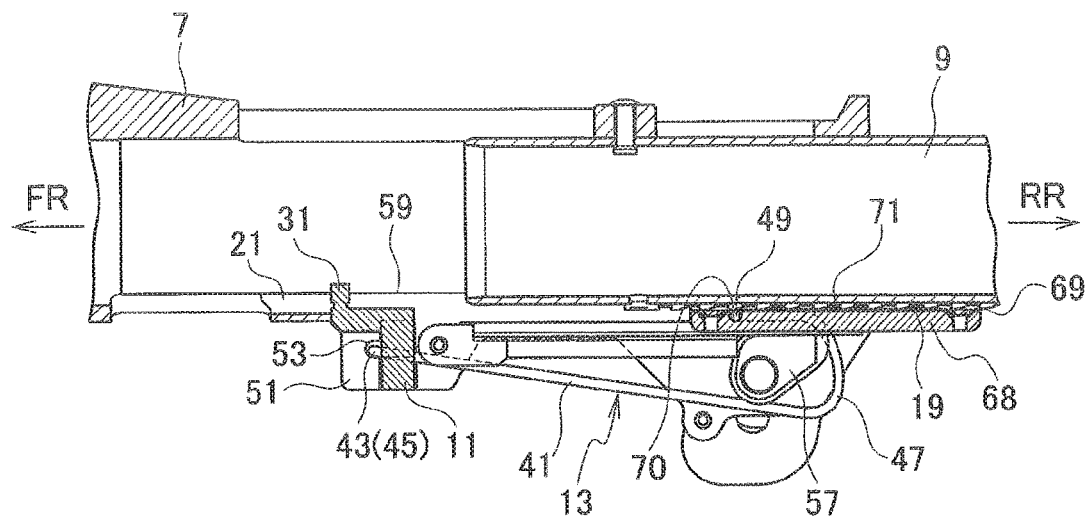
FIG. 3 is an enlarged cross-sectional view of main parts of an outer column and an inner column in FIG. 2.

As illustrated in FIGS. 2 and 3, the locking mechanism 60 includes the operating lever 15, the operating shaft 64, the guiderail 67, the locking member 68, a locked member 69, and a cam member 57.

The operating shaft 64 has a shaft shape, penetrates through the tilt slots in both hanging portions of the attachment bracket 2 and both clamp parts 63 of the outer column 7 along the vehicle width direction, and is supported to the clamp parts 63 in such a way as to be turnable about its axis.

The operating lever 15 is disposed on the operating shaft 64.

The front end of the guiderail 67 is pivotally supported to the guiderail supporting parts 65, provided on the outer periphery of the outer column 7, with the supporting pin 66 such that the guiderail 67 can be swung, while the rear end side is held between the locking member 68 and the cam member 57. In this case, the cam member 57 presses the locking member 68 against the locked member 69 via the guiderail 67. With such a configuration, a force (frictional force) in the direction of rotation of the cam member 57 is not transmitted to the locking member 68, and only a force in the radial direction is transmitted to the locking member 68. In this way, the inner column 9 can be fixed without being displaced in the tube-axis direction from the desired position when a locking operation is performed.

As illustrated in FIG. 3, the locking member 68 forms a row of claws configured to engage with the locked member 69, and a wire-member catching part 70 is formed in the locking member 68. Also, a spring member 71 formed of a leaf spring is disposed between the locking member 68 and the locked member 69.

The wire-member catching part 70 is a recess provided in the upper surface of the locking member 68, and supports a second end 49 of a load absorbing wire 13.

As illustrated in FIG. 3, the locked member 69 is fixed to the outer peripheral surface of the inner column 9 along the tube-axis direction. Also, in the locked member 69, a plurality of catching recesses (locking holes) are formed opening successively in the longitudinal direction.

As illustrated in FIGS. 2 and 3, the cam member 57 is formed in a cylindrical shape, and on the outer peripheral surface of its center in the axial direction is formed a driven cam part protruding in the radial direction. Further, a rubbing part is formed on the outer peripheral surface of each end portion of the cam member 57 in the axial direction, and the load absorbing wire 13 is configured to be rubbed against the rubbing part.

Figure 5:
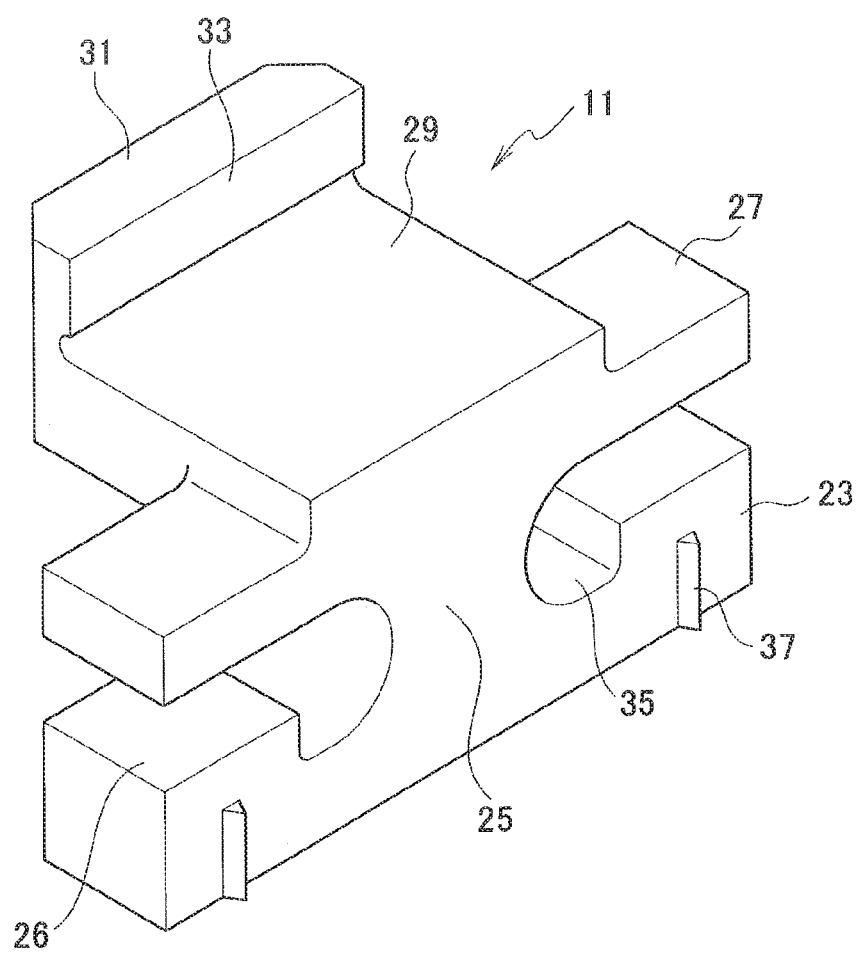
FIG. 5 is a perspective view illustrating a restricting member according to the first embodiment.

As illustrated also in FIG. 5, the restricting member 11 is provided through the tubular wall 21 at a lower section of the outer column 7 in such a way as to be capable of coming in and out of the tubular wall 21 in its thickness direction. This restricting member 11 is configured to restrict the front-end position of the inner column 9 in the direction of telescopic contraction thereof and is arranged to be releasable from the outer column 7. Specifically, the restricting member 11 integrally includes a lower holding part 23 extending in the vehicle width direction, a linking part 25 extending upward from a center portion of the lower holding part 23 in the vehicle width direction, an upper holding part 27 linked to the lower holding part 23 by the linking part 25, an upper extension part 29 provided on the upper holding part 27, and a stopper part 31 formed at the front end of the upper extension part 29. Further, this stopper part 31 is held in the tubular wall 21 at the lower section of the outer column 7. Furthermore, the upper surfaces of the right and left sides of the lower holding part 23 are formed as flat wire push surfaces 26, and the vehicle rear side of the stopper part 31 is formed as a contact surface 33. This contact surface 33 restricts the front-end position of the inner column 9 in the direction of telescopic contraction thereof. Specifically, the front-rear position at which a lower portion of the front end of the inner column 9 contacts the contact surface 33 in telescopic adjustment is the foremost position in the direction of telescopic contraction. Moreover, a pair of wire insertion parts 35 into which to insert the load absorbing wire 13 are formed in the lower holding part 23 by the right and left of the linking part 25. Meanwhile, in total four protrusions 37 in the shape of a triangular prism extending in the vertical direction are provided on right and left portions of the front surface of the lower holding part 23 and right and left portions of the rear surface of the lower holding part 23.

Figure 4:
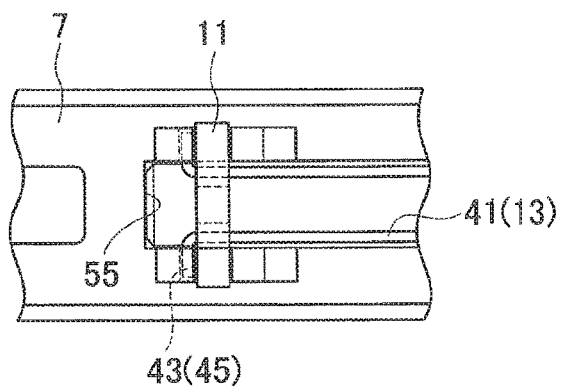
FIG. 4 is a bottom view of FIG. 3 as seen from below.

The above load absorbing wire 13 is curved in a J-shape in a side view. Specifically, the load absorbing wire 13 is integrally formed of: a pair of right and left main parts 41 extending straight in the vehicle longitudinal direction substantially in parallel to the outer column 7; bent parts 43 (first ends 45) formed in L-shapes in a plan view and bent outward in directions crossing the outer column 7 from the front ends of the main parts 41 on the vehicle front side; curved parts 47 formed in a U-shape in the side view and curved upward from the rear ends of the main parts 41 on the vehicle rear side; and the second end 49 extending toward the vehicle front side from the curved parts 47 with the tips formed integrally with each other in the vehicle width direction. Note that the second end 49 of the load absorbing wire 13 is fixed to the inner column 9 by the wire-member catching part 70 during the locked state. Also, at the lower section of the outer column 7, a wire holding part 51 protruding downward is provided. In the wire holding part 51, notches 53 are formed with their vehicle rear sides open to be capable of housing the bent parts 43 of the load absorbing wire 13. Further, as illustrated in FIG. 4, the slit 55, which has a rectangular shape along the front-rear direction, is formed in the lower section of the outer column 7. Furthermore, as illustrated in FIG. 3, the cam member 57 projects downward from the lower section of the outer column 7. The load absorbing wire 13 is routed under this cam member 57. In a collision of the vehicle, the inner column 9 moves toward the front side together with the locking member 68 and the second end 49 of the load absorbing wire 13. Then, the curved parts 47 of the load absorbing wire 13 are pulled around the outer peripheral surface of the cam member 57, and thereafter the curved parts 47 and the main parts 41 of the load absorbing wire 13 are rubbed against the rubbing parts on the outer peripheral surface of the cam member 57 and deformed accordingly. As a result, the impact energy is absorbed.

Next, movement of the restricting member 11 in a collision of the vehicle will be described with reference to FIGS. 6A to 6C.

Figure 6A:
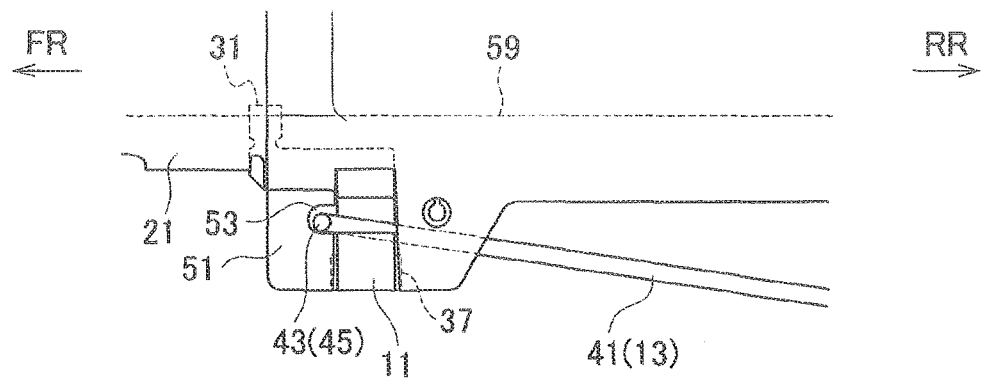
FIG. 6A is a left side view illustrating movement of the restricting member according to the first embodiment and illustrates a state before a collision of the vehicle.

As illustrated in FIG. 6A, during normal vehicle travel, the stopper part 31 of the restricting member 11 is disposed to project to a radially inner side (upper side in FIG. 6A) of an inner peripheral surface 59 of the tubular wall 21 of the outer column 7. With the triangular-prism protrusions 37, illustrated in FIG. 5, biting into the wire holding part 51 at the lower section of the outer column 7, the restricting member 11 is held in the wire holding part 51 and does not get released by its own weight. Also, the bent parts 43 of the load absorbing wire 13 are housed in the notches 53 of the wire holding part 51.

Figure 6B:
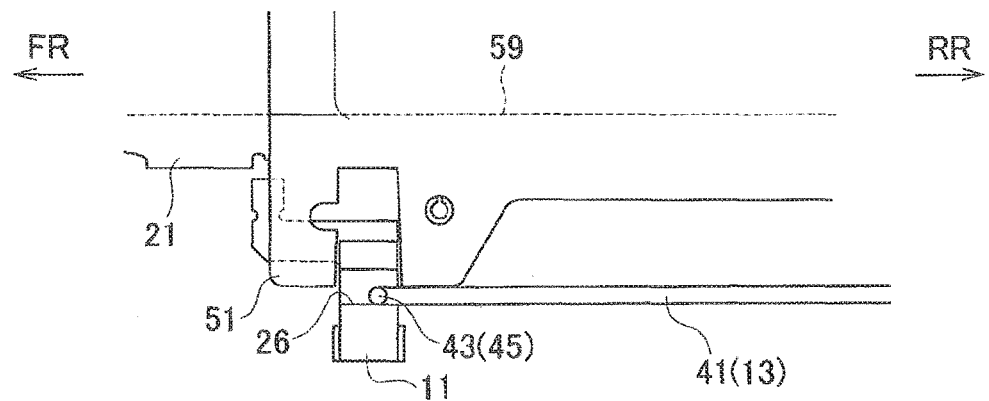
FIG. 6B is a left side view illustrating movement of the restricting member according to the first embodiment and illustrates a state immediately after the collision of the vehicle.

As illustrated in FIG. 6B, when a load of a preset value or greater is applied to the inner column 9 toward the vehicle front side in a collision of the vehicle, the inner column 9, described with reference to FIG. 3, moves toward the front side together with the locking member 68 and the second end 49 of the load absorbing wire 13. Then, the main parts 41 of the load absorbing wire 13 turn counterclockwise in the side view about the cam member 57 such that the bent parts 43 sink. At the same time, as the bent parts 43 of the load absorbing wire 13 exit the notches 53 of the wire holding part 51 and move toward the rear side, the bent parts 43 slide on the wire push surfaces 26 of the restricting member 11 while pushing down the wire push surfaces 26.

Figure 6C:
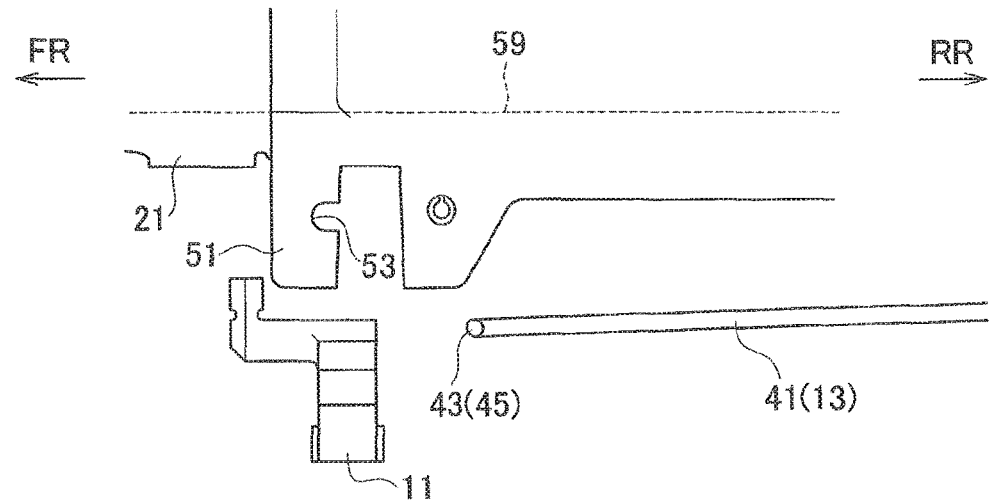
FIG. 6C is a left side view illustrating movement of the restricting member according to the first embodiment and illustrates a state in the last half of the collision of the vehicle.
Figure 7:
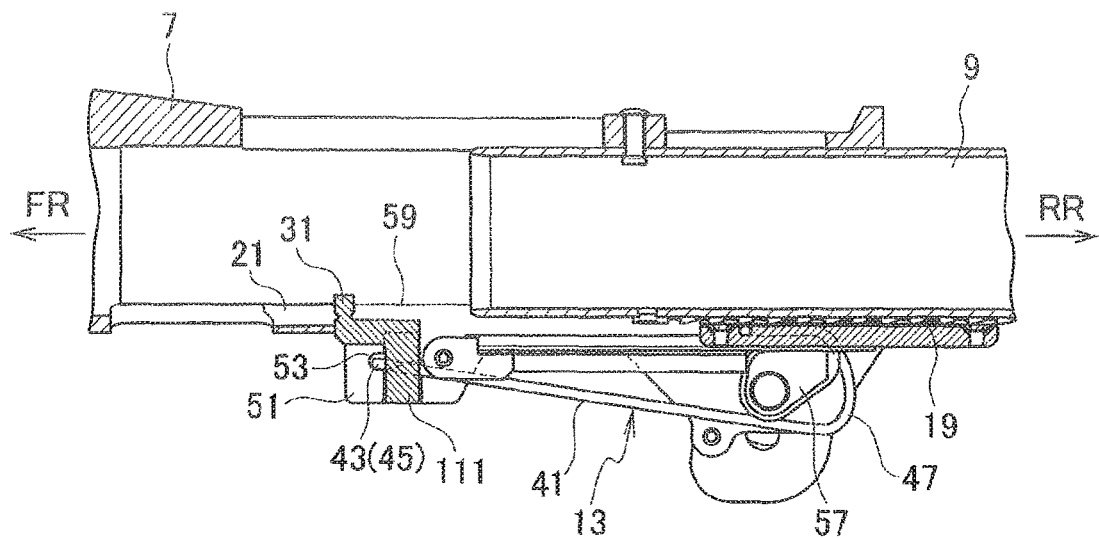
FIG. 7 is an enlarged cross-sectional view of main parts of an outer column and an inner column in a second embodiment.
Figure 8:
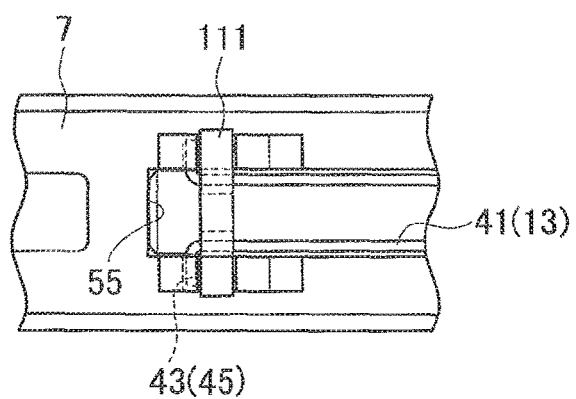
FIG. 8 is a bottom view of FIG. 7 as seen from below.
Figure 9:
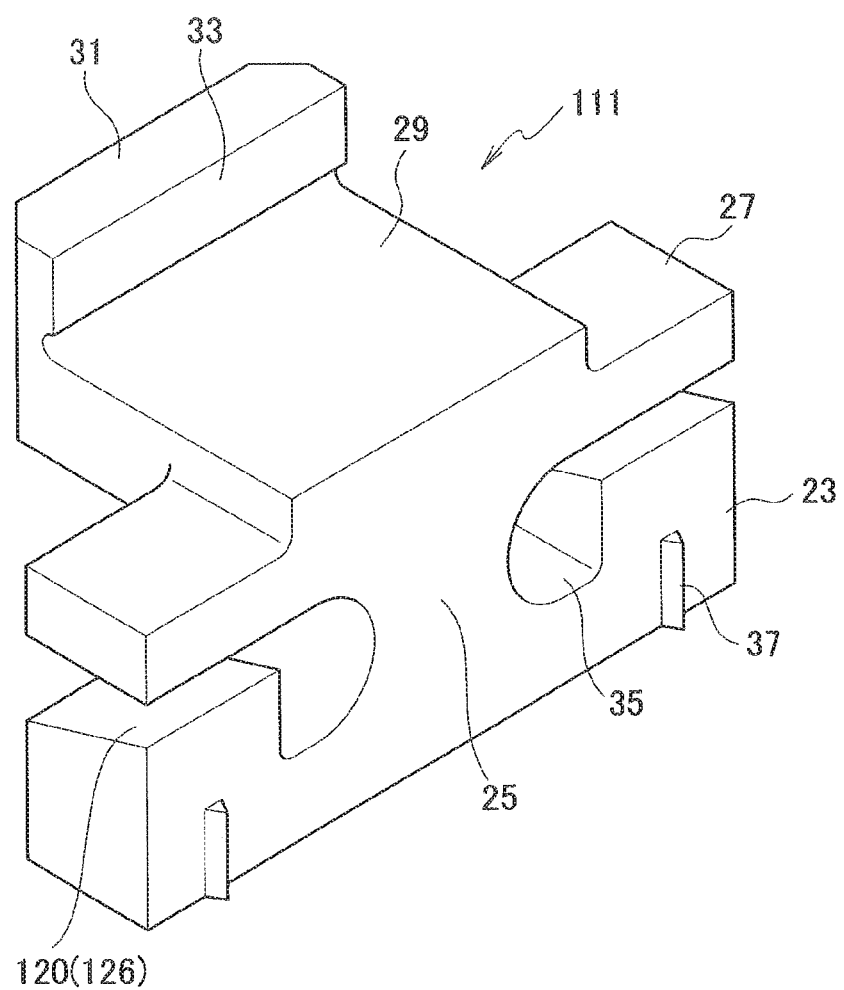
FIG. 9 is a perspective view illustrating a restricting member according to the second embodiment.
Figure 10A:
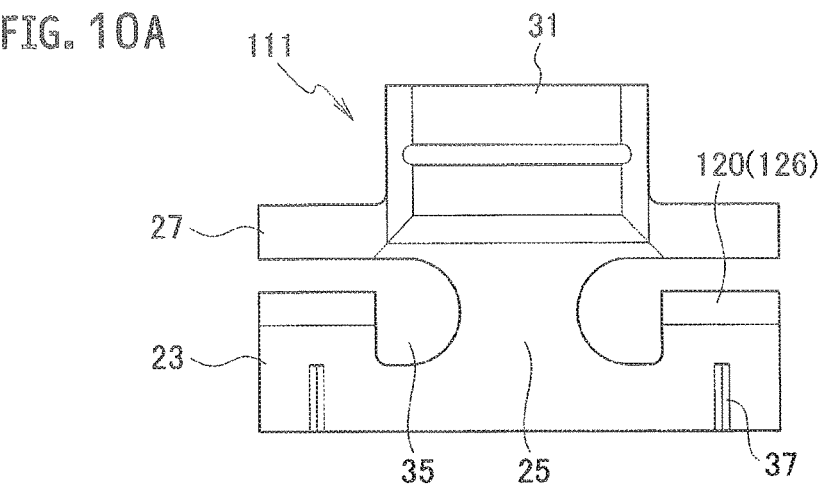
FIG. 10A is a front view of the restricting member in FIG. 9 as seen from the front side of a vehicle.
Figure 10B:
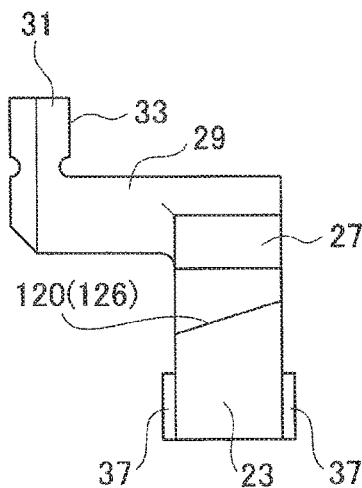
FIG. 10B is a side view of the restricting member in FIG. 9 as seen from the left side of the vehicle.
Figure 10C:
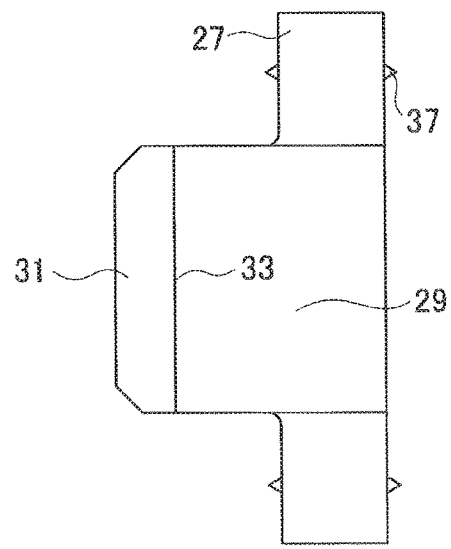
FIG. 10C is a plan view of the restricting member in FIG. 9 as seen from the top side of the vehicle.

Consequently, the restricting member 11 is released from the wire holding part 51 of the outer column 7, as illustrated in FIGS. 6B and 6C.

Advantageous effects by the first embodiment will be described below.

(1) The steering column device 1 according to the first embodiment includes: the outer column 7 having a tubular shape and arranged along the vehicle longitudinal direction; the inner column 9 inserted in the outer column 7 in such a way as to be movable in the tube-axis direction and capable of telescopic operation; the restricting member 11 provided through the tubular wall 21 at the lower section of the outer column 7 in such a way as to be capable of coming in and out of the tubular wall 21 in the thickness direction thereof, and configured to restrict the front-end position of the inner column 9 in the direction of telescopic contraction thereof with the stopper part 31; and the load absorbing wire 13 including the first ends 45 engageable with the restricting member 11 and the second end 49 supported on the inner column 9 side, and configured to be deformed by movement of the second end 49 toward the vehicle front side together with the inner column 9 upon application of a load of the preset value or greater to the inner column 9 toward the vehicle front side, to thereby absorb the load.

The stopper part 31 of the restricting member 11 is normally disposed to project to a radially inner side of the inner peripheral surface 59 of the tubular wall 21 of the outer column 7, and the stopper parts 31 of the restricting member 11 are capable of being moved by the load absorbing wire 13 to a position on a radially outer side of the inner peripheral surface 59 of the tubular wall 21 of the outer column 7 when the load absorbing wire 13 is deformed upon application of a load of the preset value or greater to the inner column 9 toward the vehicle front side.

Thus, when the inner column 9 moves toward the vehicle front side in a collision of the vehicle, the stopper part 31 of the restricting member 11 sinks below (radially outer side of) the inner peripheral surface 59 of the tubular wall 21 of the outer column 7. In this way, the front end of the inner column 9 can avoid contact with the stopper part 31 of the restricting member 11 and move toward the front side beyond the stopper part 31. This makes it possible to suppress abrupt increase in impact absorption load in the middle of absorption of the impact energy.

(2) The restricting member 11, with which the first ends 45 of the load absorbing wire 13 engage, includes the wire push surfaces 26.

Thus, when the first ends 45 of the load absorbing wire 13 move toward the vehicle rear side upon application of a load of the preset value or greater to the inner column 9 toward the vehicle front side, the first ends 45 of the load absorbing wire 13 can push down the wire push surfaces 26 of the restricting member 11. Hence, the restricting member 11 can be forcibly released from the wire holding part 51 of the outer column 7. This makes it possible to further suppress abrupt increase in impact absorption load in the middle of absorption of the impact energy.

Second Embodiment

Next, a second embodiment will be described with reference to FIGS. 7 to 11C. The same components as those in the above-described first embodiment will be denoted by the same reference signs, and description thereof will be omitted.

A restricting member according to the second embodiment is such that the wire push surfaces of its lower holding part are formed as inclined surfaces.

As illustrated in FIGS. 7 to 10C, a restricting member 111 according to the second embodiment integrally includes a lower holding part 23 extending in the vehicle width direction, a linking part 25 extending upward from a center portion of the lower holding part 23 in the vehicle width direction, an upper holding part 27 linked to the lower holding part 23 by the linking part 25, an upper extension part 29 provided on the upper holding part 27, and a stopper part 31 formed at the front end of the upper extension part 29. Further, the upper surfaces of the right and left sides of the lower holding part 23 are formed as wire push surfaces 120 which are inclined surfaces 126 extending obliquely upward toward the rear side relative to the tube-axis direction of the outer column 7 in a side view. The vehicle rear side of the stopper part 31 is formed as a contact surface 33.

Next, movement of the restricting member 111 in a collision of the vehicle will be described with reference to FIGS. 11A to 11C.

Figure 11A:
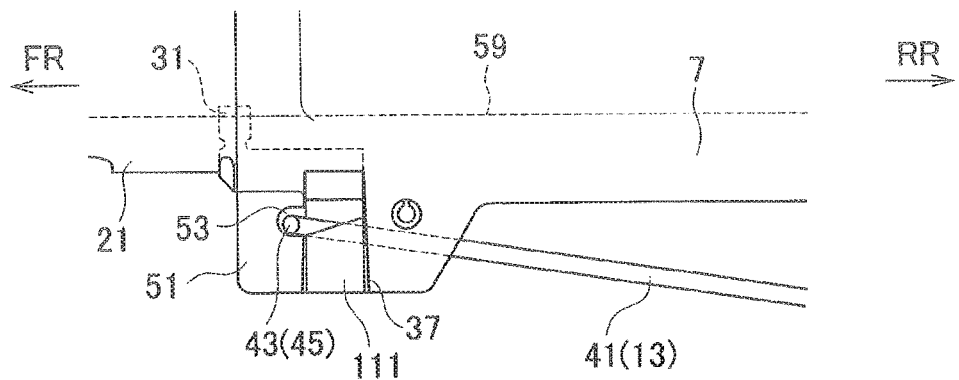
FIG. 11A is a left side view illustrating movement of the restricting member according to the second embodiment and illustrates a state before a collision of the vehicle.

As illustrated in FIG. 11A, during normal vehicle travel, the stopper part 31 of the restricting member 111 is disposed to project to a radially inner side (upper side in FIG. 11A) of the inner peripheral surface 59 of the tubular wall 21 of the outer column 7. With triangular-prism protrusions 37 on the restricting member 111 biting into the wire holding part 51 at the lower section of the outer column 7, the restricting member 111 is held in the wire holding part 51 and does not get released by its own weight. Also, the bent parts 43 (first ends 45) of the load absorbing wire 13 are housed in the notches 53 of the wire holding part 51.

Figure 11B:
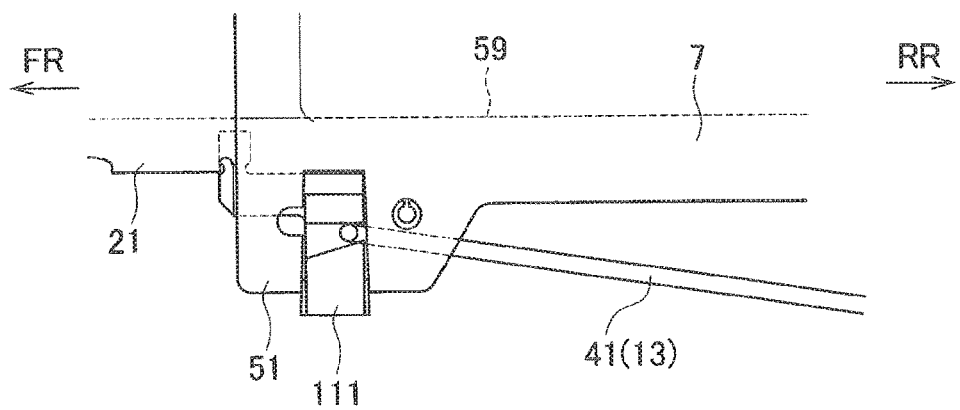
FIG. 11B is a left side view illustrating movement of the restricting member according to the second embodiment and illustrates a state immediately after the collision of the vehicle.
Figure 11C:
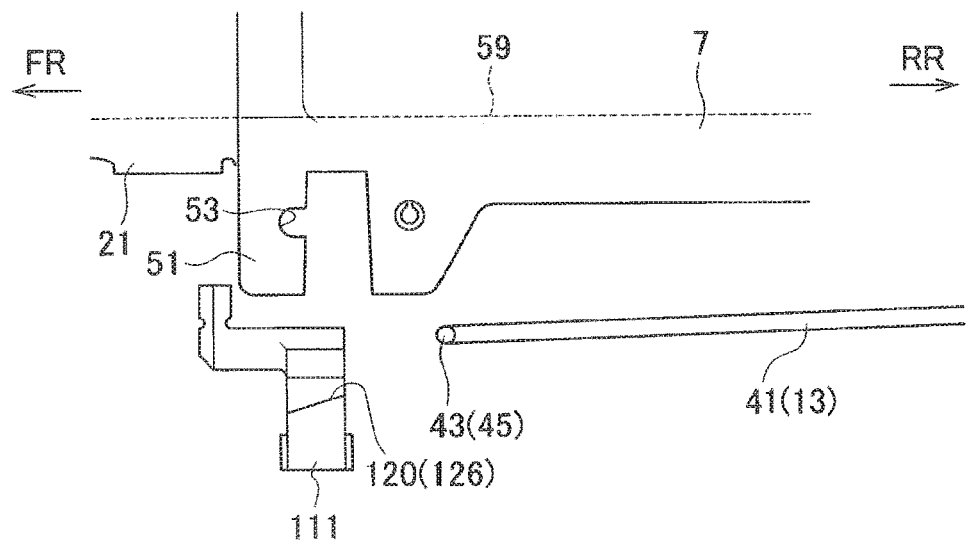
FIG. 11C is a left side view illustrating movement of the restricting member according to the second embodiment and illustrates a state in the last half of the collision of the vehicle.

As illustrated in FIG. 11B, when a load of the preset value or greater is applied to the inner column 9 toward the vehicle front side in a collision of the vehicle, the inner column 9 moves toward the front side together with the locking member 68 and the second end 49 of the load absorbing wire 13. Then, the main parts 41 of the load absorbing wire 13 turn counterclockwise in the side view about the cam member 57 such that the bent parts 43 sink. At the same time, as the bent parts 43 of the load absorbing wire 13 exit the notches 53 of the wire holding part 51 and move toward the rear side, the bent parts 43 slide on the wire push surfaces 120 of the restricting member 111 while pushing down the wire push surfaces 120. Note that the wire push surfaces 120 in the second embodiment are formed as the inclined surface 126, which extend obliquely upward toward the rear side in the side view. Hence, when the bent parts 43 of the load absorbing wire 13 move toward the vehicle rear side, the restricting member 111 is moved downward to a greater extent than the first embodiment. Consequently, the restricting member 111 is released from the wire holding part 51 of the outer column 7, as illustrated in FIGS. 11B and 11C.

An advantageous effect by the second embodiment will be described below.

The restricting member 111, with which the first ends 45 of the load absorbing wire 13 engage, includes the inclined surfaces 126, which extend obliquely upward toward the rear side relative to the tube-axis direction of the outer column 7 in a side view.

Thus, when the first ends 45 of the load absorbing wire 13 move toward the vehicle rear side upon application of a load of the preset value or greater to the inner column 9 toward the vehicle front side, the bent parts 43 (first ends 45) of the load absorbing wire 13 push down the inclined surfaces 126 of the restricting member 111. Accordingly, the bent parts 43 of the load absorbing wire 13 can push down the restricting member 111 to a greater extent.

Third Embodiment

Next, a third embodiment will be described with reference to FIGS. 12A to 12C. The same components as those in the above-described first and second embodiments will be denoted by the same reference signs, and description thereof will be omitted.

A load absorbing wire according to the third embodiment is such that its first ends 45 (front ends) are bent in a V shape in a side view.

Specifically, as illustrated in FIG. 12A, bent parts 243 formed in a V shape in a side view are provided at first ends 45 of a load absorbing wire 13. More specifically, the front ends of the load absorbing wire 13 include main parts 41 extending straight in the side view and the bent parts 243 bent from the front ends of the main parts 41 in such a way as to extend obliquely downward toward the front side. Meanwhile, the third embodiment uses the same restricting member 11 as the first embodiment.

Next, movement of the restricting member 11 in a collision of the vehicle will be described with reference to FIGS. 12A to 12C.

As illustrated in FIG. 12A, during normal vehicle travel, the stopper part 31 of the restricting member 11 is disposed to project to a radially inner side (upper side in FIG. 12A) of the inner peripheral surface 59 of the tubular wall 21 of the outer column 7. With the triangular-prism protrusions 37 of the restricting member 11 biting into the wire holding part 51 at the lower section of the outer column 7, the restricting member 11 is held in the wire holding part 51 and does not get released by its own weight.

As illustrated in FIG. 12B, when a load of the preset value or greater is applied to the inner column 9 toward the vehicle front side in a collision of the vehicle, the inner column 9 moves toward the front side together with the locking member 68 and the second end of the load absorbing wire 13. Then, the main parts 41 of the load absorbing wire 13 turn counterclockwise in the side view about the cam member 57 such that the bent parts 243 sink. At the same time, since the bent parts 243 of the load absorbing wire 13 are bent in the V shape in the side view, as the load absorbing wire 13 moves toward the rear side, the lower sides of the front ends of the bent parts 243 slide toward the rear side on the bottom surfaces of the wire insertion parts 35 of the restricting member 11 while pushing down the bottom surfaces of the wire insertion parts 35. Consequently, the restricting member 11 is released from the wire holding part 51 of the outer column 7, as illustrated in FIGS. 12B and 12C.

An advantageous effect by the third embodiment will be described below.

(1) The bent parts 243 formed in the V shape in a side view are provided at the first ends 45 of the load absorbing wire 13.

Thus, when the first ends 45 of the load absorbing wire 13 move toward the vehicle rear side upon application of a load of the preset value or greater to the inner column 9 toward the vehicle front side, the bent parts 243 at the first ends 45 of the load absorbing wire 13 push down the restricting member 11. Accordingly, the bent parts 243 at the first ends 45 of the load absorbing wire 13 can push down the restricting member 11 to a greater extent.

Fourth Embodiment

Next, a fourth embodiment will be described with reference to FIG. 13 and FIGS. 14A to 14B. The same components as those in the above-described first to third embodiments will be denoted by the same reference signs, and description thereof will be omitted.

Figure 13:
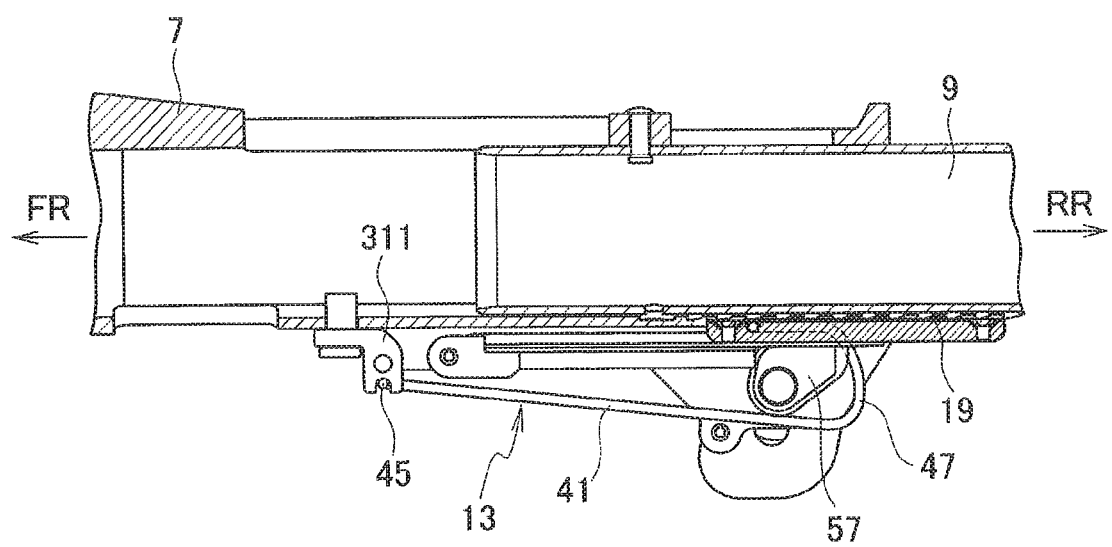
FIG. 13 is a left side view illustrating movement of a restricting member according to a fourth embodiment and illustrates a state before a collision of a vehicle.
Figure 14A:
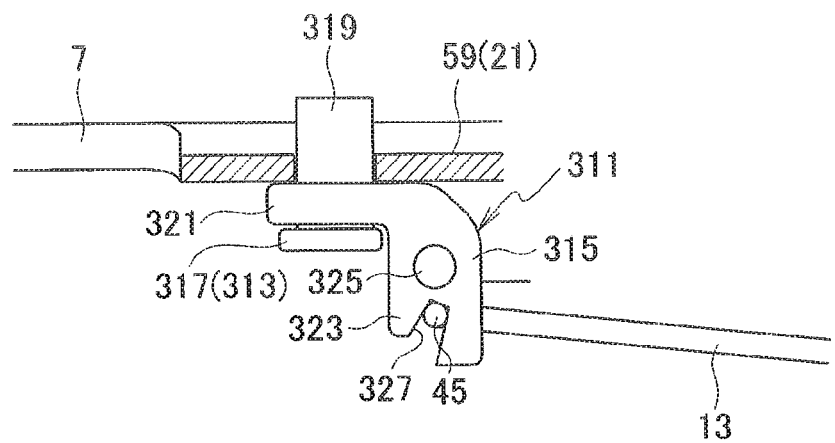
FIG. 14A is a left side view illustrating movement of the restricting member according to the fourth embodiment and is an enlarged view of a main part in FIG. 13.
Figure 14B:
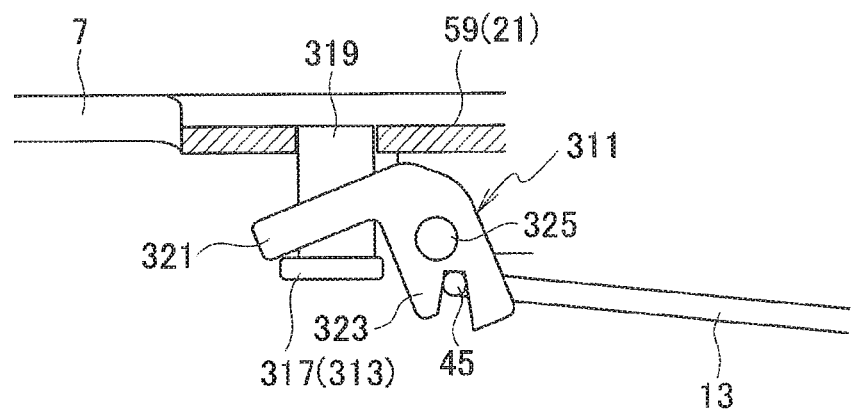
FIG. 14B is a left side view illustrating movement of the restricting member according to the fourth embodiment and illustrates a state in the last half of the collision of the vehicle.

As illustrated in FIG. 13 and FIGS. 14A to 14B, a restricting member 311 according to the fourth embodiment includes an upper part 313 movable in the vertical direction and a lower part 315 pivotally supported in such a way as to be capable of turning to push down the upper part 313.

The upper part 313 includes a catching part 317 provided on the lower side, and a stopper part 319 provided on the catching part 317. The stopper part 319 normally projects to a radially inner side (upper side in FIGS. 13 and 14) of the inner peripheral surface 59 of the tubular wall 21 of the outer column 7. When projecting to the radially inner side of the tubular wall 21, the stopper part 319 restricts the front-end position of the inner column 9 in the direction of telescopic contraction thereof. Also, the catching part 317 is configured to be pushed down by contacting the lower part 315, as described later.

The lower part 315 is a member bent in an L-shape in a side view with a front leg part 321 extending toward the front side and a lower leg part 323 extending downward from the rear end of the front leg part 321, and is pivotally supported at its middle part to the outer column 7 via a turn shaft portion 325 such that the lower part 315 can turn. Also, at the lower end of the lower leg part 323, a wire hook portion 327 is formed which is recessed upward. The first ends 45 of the load absorbing wire 13 are inserted and caught in this wire hook portion 327.

Next, movement of the restricting member 311 in a collision of the vehicle will be described with reference to FIGS. 14A to 14B.

As illustrated in FIG. 14A, during normal vehicle travel, the stopper part 319 projects to a radially inner side (upper side in FIGS. 14A to 14B) of the inner peripheral surface 59 of the tubular wall 21 of the outer column 7.

When a load of the preset value or greater is applied to the inner column 9 toward the vehicle front side in a collision of the vehicle, the inner column 9 moves toward the front side together with the locking member 68 and the second end 49 of the load absorbing wire 13. Then, the main parts 41 of the load absorbing wire 13 turn counterclockwise in the side view about the cam member 57 such that the front ends (first ends 45) sink, and the load absorbing wire 13 moves rearward.

Since the front ends (first ends 45) of the load absorbing wire 13 are caught in the wire hook portion 327 of the lower part 315 of the restricting member 311, the lower part 315 turns counterclockwise about the turn shaft portion 325 with the rearward movement of the load absorbing wire 13.

Consequently, as illustrated in FIG. 14B, the front leg part 321 of the lower part 315 pushes down the catching part 317 of the upper part 313, so that the stopper part 319 moves to a radially outer side (lower side in FIG. 13 and FIGS. 14A to 14B) of the inner peripheral surface 59 of the tubular wall 21 of the outer column 7.

An advantageous effect by the fourth embodiment will be described below.

The restricting member 311 includes the upper part 313 provided at its upper end with the stopper part 319 configured to project to a radially inner side of the tubular wall 21 of the outer column 7, and the lower part 315 configured to be turnable with the first ends 45 of the load absorbing wire 13 caught thereon.

When the first ends 45 of the load absorbing wire 13 move toward the vehicle rear side upon application of a load of the preset value or greater to the inner column 9 toward the vehicle front side, the lower part 315 turns about the turn shaft portion 325 to push down the upper part 313. In this way, the first ends 45 of the load absorbing wire 13 can push down the stopper part 319 of the restricting member 311 to a greater extent.

It is to be noted that the present is not limited to the above-described embodiments but various changes and the like can be made thereto.

The invention claimed is:

1. A steering column device comprising:
an outer column having a tubular shape and arranged along a vehicle longitudinal direction;
an inner column inserted in the outer column in such a way as to be movable in a tube-axis direction and capable of telescopic operation;
a restricting member provided through a tubular wall at a lower section of the outer column in such a way as to be capable of coming in and out of the tubular wall in a thickness direction thereof, and configured to restrict a front-end position of the inner column in a direction of telescopic contraction thereof with a stopper part; and
a load absorbing wire including a first end engageable with the restricting member and a second end supported on the inner column side, and configured to be deformed by movement of the second end toward a vehicle front side together with the inner column upon application of a load of a preset value or greater to the inner column toward the vehicle front side, to thereby absorb the load, wherein
the stopper part of the restricting member is normally disposed to project to a radially inner side of an inner peripheral surface of the tubular wall of the outer column and thereby restrict the front-end position of the inner column in the direction of the telescopic contraction thereof, and
the stopper part of the restricting member is capable of being moved by the load absorbing wire to a position on a radially outer side of the inner peripheral surface of the tubular wall of the outer column when the load absorbing wire is deformed upon application of a load of a preset value or greater to the inner column toward the vehicle front side.

2. The steering column device according to claim 1, wherein
the restricting member, with which the first end of the load absorbing wire engages, includes an inclined surface extending obliquely upward toward a rear side relative to the tube-axis direction of the outer column in a side view, and
the first end of the load absorbing wire pushes down the inclined surface of the restricting member when the first end of the load absorbing wire moves toward a vehicle rear side upon application of a load of the preset value or greater to the inner column toward the vehicle front side.

3. The steering column device according to claim 1, wherein
a bent part formed in a V shape in a side view is provided at the first end of the load absorbing wire, and
the bent part at the first end of the load absorbing wire pushes down the restricting member when the first end of the load absorbing wire moves toward a vehicle rear side upon application of a load of the preset value or greater to the inner column toward the vehicle front side.

4. The steering column device according to claim 1, wherein
the restricting member includes
an upper part provided at an upper end thereof with a stopper part configured to project to a radially inner side of the inner peripheral surface of the tubular wall of the outer column, and
a lower part configured to be turnable with the first end of the load absorbing wire caught thereon, and
the lower part turns to push down the upper part when the first end of the load absorbing wire moves toward a vehicle rear side upon application of a load of the preset value or greater to the inner column toward the vehicle front side.

* * * * *